(12) United States Patent
Patel

(10) Patent No.: US 9,749,364 B2
(45) Date of Patent: Aug. 29, 2017

(54) PRIVACY FOR INTER-USER EQUIPMENT TRANSFER (IUT) SUBSCRIBERS AND FOR REMOTE PARTIES INVOLVED IN SESSIONS WITH IUT SUBSCRIBERS

(75) Inventor: Milan Patel, Harrow (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 705 days.

(21) Appl. No.: 13/404,260

(22) Filed: Feb. 24, 2012

(65) Prior Publication Data

US 2012/0244844 A1 Sep. 27, 2012

Related U.S. Application Data

(60) Provisional application No. 61/450,356, filed on Mar. 8, 2011.

(51) Int. Cl.
*H04M 3/42* (2006.01)
*H04L 29/06* (2006.01)
*H04L 29/08* (2006.01)

(52) U.S. Cl.
CPC ...... *H04L 65/1083* (2013.01); *H04L 65/1093* (2013.01); *H04L 67/148* (2013.01); *H04L 63/10* (2013.01)

(58) Field of Classification Search
CPC ....... H04W 4/14; H04W 88/02; H04W 8/245; G06F 21/10; G06F 13/385;
(Continued)

(56) References Cited

U.S. PATENT DOCUMENTS 8,064,818 B2 11/2011 Tobita et al.
8,639,214 B1 * 1/2014 Fujisaki ................. 455/406
(Continued)

FOREIGN PATENT DOCUMENTS

CN 101093528 A 12/2007
CN 101369966 A 2/2009
(Continued)

OTHER PUBLICATIONS

European Telecommunications Standards Institute (ETSI), TS 102 690, V1.1.1, "Machine-to-Machine Communications (M2M); Functional Architecture", Oct. 2011, 280 pages.
(Continued)

*Primary Examiner* — Nimesh Patel
(74) *Attorney, Agent, or Firm* — Condo Roccia Koptiw LLP

(57) ABSTRACT

Systems, methods, and instrumentalities are disclosed to provide privacy for inter-user equipment transfer (IUT) subscribers and remote parties involved in sessions with IUT subscribers. A first UE may establish a session with a remote party. The first UE may seek to perform an IUT to a second UE. The first UE may send a first request for the IUT to a service centralization and continuity application server (SCC AS). The SCC AS may receive the first request and perform an authorization. The SCC AS may determine that the requested IUT is allowed for the session. The SCC AS may send a second request to the remote party indicating the requested IUT. The remote party may evaluate the second request and may accept or reject the second request.

20 Claims, 9 Drawing Sheets

(58) Field of Classification Search
CPC ...... G06F 17/30017; G06F 2213/3814; G06Q
30/0603; G06Q 50/184; G06Q 10/06;
G06Q 20/36; G06Q 50/32; H04N
21/2541; H04N 24/43615; H04N
21/234309; H04N 21/25816; H04N
21/4126; H04N 21/4405; H04N 21/835;
H04N 7/17318; H04L 2209/603; H04L
9/08; H04L 65/4076; H04L 65/4084;
H04L 65/80; H04L 67/30
USPC ....... 455/414.1, 418, 419, 420; 726/4, 6, 14,
726/17, 27, 29, 30; 713/151, 152
See application file for complete search history.

(56) References Cited

U.S. PATENT DOCUMENTS

| | | | |
|---|---|---|---|
| 2009/0063314 A1 | 3/2009 | Wang et al. | |
| 2010/0146142 A1 | 6/2010 | Long et al. | |
| 2010/0279670 A1* | 11/2010 | Ghai et al. | 455/414.3 |
| 2011/0065419 A1* | 3/2011 | Book | G06F 21/305 |
| | | | 455/411 |
| 2011/0231553 A1* | 9/2011 | Patel et al. | 709/226 |
| 2011/0288971 A1* | 11/2011 | Wang et al. | 705/30 |
| 2012/0011257 A1* | 1/2012 | Kim et al. | 709/227 |

FOREIGN PATENT DOCUMENTS

| | | |
|---|---|---|
| CN | 101383815 A | 3/2009 |
| CN | 101883443 A | 11/2010 |
| JP | 2008-060805 A | 3/2008 |
| JP | 2010-026797 A | 2/2010 |
| JP | 2012-508993 A | 4/2012 |
| WO | WO 2010/015208 A1 | 2/2010 |
| WO | WO 2010/081146 A2 | 7/2010 |
| WO | WO 2010/132820 A1 | 11/2010 |
| WO | WO 2010/132824 A1 | 11/2010 |

OTHER PUBLICATIONS

3rd Generation Partnership Project (3GPP), S1-011197 V0.0.0, "3rd Generation Partnership Project; Technical Specification Group Services and System Aspects; Digital Rights Management; Proposed Stage 1 (Release 6)", Nov. 23, 2001, 19 pages.

Shacham et al., "Session Initiation Protocol (SIP) Session Mobility", Network Working Group, Request for Comments: 5631, Category: Informational, Copyright 2009, Internet Engineering Task Force (IETF), Oct. 1, 2009, 35 pages.

$3^{rd}$ Generation Partnership Project (3GPP), TS 23.237, V10.9.0, "$3^{rd}$ Generation Partnership Project; Technical Specification Group Services and System Aspects; IP Multimedia Subsystem (IMS) Service Continuity; Stage 2 (Release 10)", Mar. 2012, 154 pages.

$3^{rd}$ Generation Partnership Project (3GPP), TS 24.237, V10.3.0, "3rd Generation Partnership Project; Technical Specification Group Core Network and Terminals; IP Multimedia (IM) Core Network (CN) subsystem IP Multimedia Subsystem (IMS) Service Continuity; Stage 3 (Release 10)", Jun. 2011, 205 pages.

$3^{rd}$ Generation Partnership Project (3GPP), TR 24.837, V10.0.0, "$3^{rd}$ Generation Partnership Project; Technical Specification Group Core Network and Terminals; IP Multimedia (IM) Core Network (CN) subsystem inter-UE transfer enhancements; Stage 3 (Release 10)", Mar. 2011, 361 pages.

Rosenberg et al., "SIP: Session Initiation Protocol", The Internet Engineering Task Force (IETF), RFC #3261, Jun. 2002, 265 pages.

Handley et al., "SDP: Session Description Protocol", The Internet Engineering Task Force (IETF), RFC #4566, Jul. 2006, 49 pages.

Rosenberg et al., "An Offer/Answer Model with the Session Description Protocol (SDP)", The Internet Engineering Task Force (IETF), RFC # 3264, Jun. 2002, 25 pages.

$3^{rd}$ Generation Partnership Project (3GPP), TR 23.831, V0.3.0, "Technical Specification Group Services and System Aspects; IP Multimedia Subsystem (IMS) Service Continuity; Inter-UE Transfer enhancements; Stage 2(Release 10)", Mar. 2010, 62 pages.

3rd Generation Partnership Project (3GPP), S1-110158, "IUT Privacy Considerations Associated with Remote End User", Huawei, 3GPP TSG-SA WG1 Meeting #53, Nashville, Tennessee, USA, Feb. 14-18, 2011, 3 pages.

3rd Generation Partnership Project (3GPP), S1-110428, "IUT Privacy Considerations Associated with Remote End User and Restricting Copyrighted Content", Huawei, 3GPP TSG-SA WG1 Meeting #53, Nashville, Tennessee, USA, Feb. 14-18, 2011, 4 pages.

3rd Generation Partnership Project (3GPP), S1-111198, "Scenarios for Inter-UE Transfer Remote Party Privacy", InterDigital Communications, Huawei, 3GPP TSG-SA WG1 Meeting #54, Xi'an, China, May 9-13, 2011, 3 pages.

3rd Generation Partnership Project (3GPP), S2-110912, "Inter-UE Transfer/Replication Control by the Remote Party", Orange, Telecom Italia, Cisco, Alcatel-Lucent, 3GPP TSG SA WG2 Meeting #83, Salt Lake City, USA, Feb. 21-25, 2011, 6 pages.

3rd Generation Partnership Project (3GPP), S2-113327, "Scenarios for Inter-UE Transfer Remote Party Privacy", InterDigital Communications, SA WG2 Meeting #86, Naantali, Finland, Jul. 11-15, 2011, 5 pages.

* cited by examiner

PRIVACY FOR INTER-USER EQUIPMENT TRANSFER (IUT) SUBSCRIBERS AND FOR REMOTE PARTIES INVOLVED IN SESSIONS WITH IUT SUBSCRIBERS

CROSS-REFERENCE TO RELATED APPLICATIONS

This application claims the benefit of U.S. Provisional Patent Application No. 61/450,356, filed on Mar. 8, 2011, the contents of which are hereby incorporated by reference herein.

BACKGROUND

Multimedia application information, e.g., multimedia "flows" (which may be referred to as media flows, or simply, flows), may be communicated to mobile nodes or user equipment (UE) across one or more wireless communication networks. A UE may include any device that may communicate with communications networks, including, but not limited to, mobile devices (e.g., mobile phones, mobile media devices, mobile computers, etc.), computing devices, media devices (e.g., video devices, audio devices, data devices, etc.), telephone devices (including landline devices), etc.

A media flow may be transferred from one mobile node or UE to another mobile node or UE. For example, a voice component (e.g., a flow) of a media session may be transferred from one phone to another phone, and, the video component of the same session may be transferred to a video projector. Such media flow transfers may be referred to as inter UE transfers (IUTs). In general, an inter-UE transfer may be a transfer, e.g., at the IMS level, of some or all of the media flows and/or service controls associated with a session.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Systems, methods, and instrumentalities are disclosed to provide privacy for inter-user equipment transfer (IUT) subscribers and remote parties involved in sessions with IUT subscribers. A first UE may establish a session with a remote party. The first UE may seek to perform an IUT to a second UE (e.g., the first UE may seek to transfer a component of the session to the second UE). The first UE may send a first request for the IUT to a service centralization and continuity application server (SCC AS). The SCC AS may receive the first request and perform an authorization of the first request. That is, the SCC AS may determine whether the IUT is allowed for the session. For example, the SCC AS may determine whether the remote party, or a network associated with the remote party, has indicated that IUTs be rejected (e.g., the SCC AS may have received an indication that IUTs be rejected for sessions subject to digital rights management). The SCC AS may reject the first request when determining that IUTs are not allowed for the session.

The SCC AS may determine that the requested IUT is allowed for the session (e.g., based on information available to the SCC AS). The SCC AS may send a second request to the remote party indicating the requested IUT. The second request may include information relating to the requested IUT. For example, the second request may indicate an identity relating to a user equipment that is a target of the requested IUT, e.g., the second request may comprise a modified session description protocol message that indicates an identity of the second UE. The remote party may evaluate the second request and may accept or reject the second request. For example, the remote party may send an acceptance to the SCC AS. The SCC AS may receive the acceptance and send a control message to the remote party for transfer of the media component to a user equipment that is a target of the requested IUT (e.g., the second UE). The control message may be a modified session description protocol message.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments may now be described with reference to the figures. However, while the present invention may be described in connection with exemplary embodiments, it is not limited thereto and it is to be understood that other embodiments may be used or modifications and additions may be made to the described embodiments for performing the same function of the present invention without deviating therefrom. In addition, the figures may illustrate call flows, which are meant to be exemplary. It is to be understood that other embodiments may be used. The order of the flows may be varied where appropriate. Also, flows may be omitted if not needed and additional flows may be added. A session, as well as one or more flows that may relate to the session, may be referenced herein. Transfers and/or replications may be disclosed herein in relation to the session. In general, the transfers and/or replications described may relate to the session or one or more flows relating to the session.

Figure 1A:
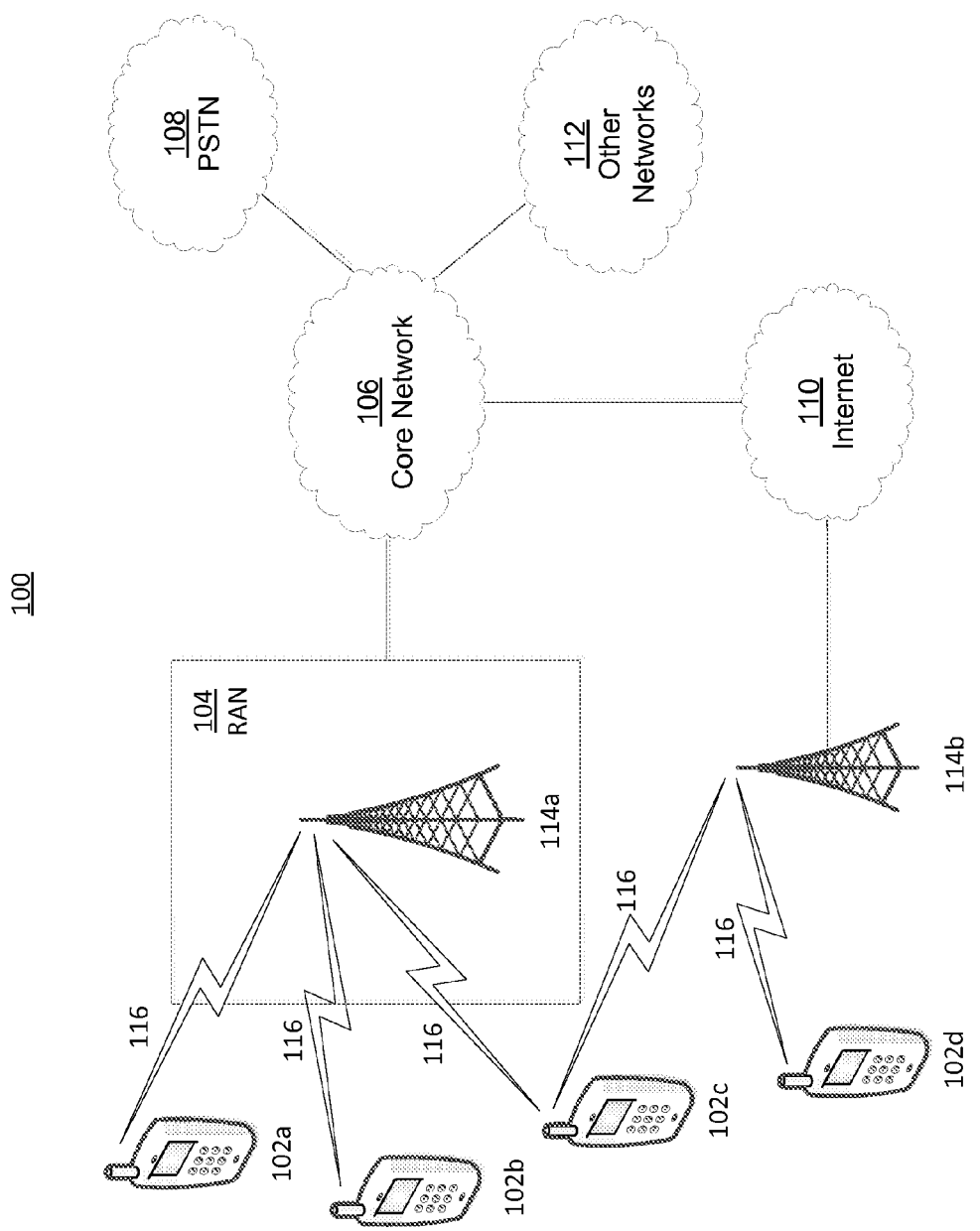
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
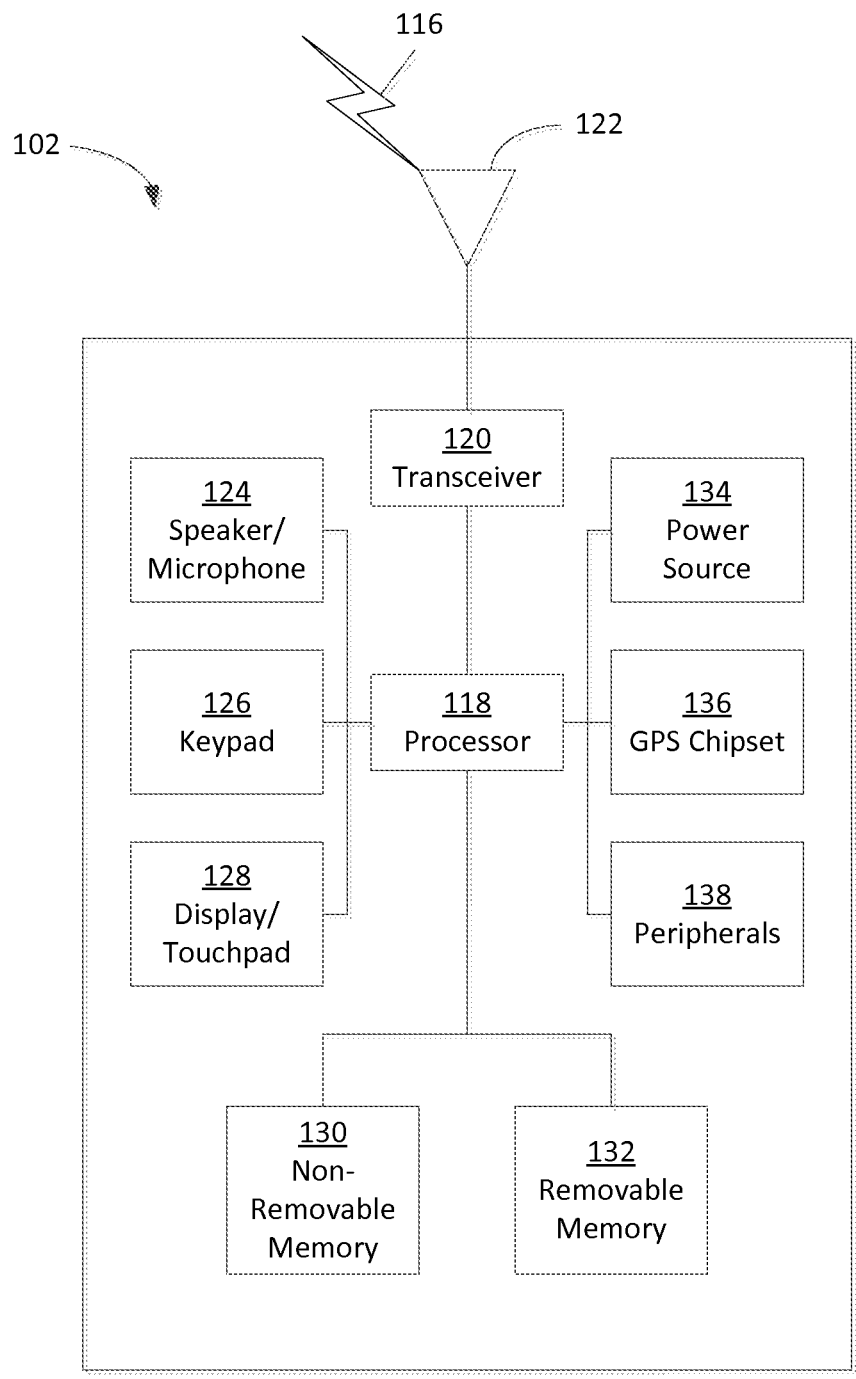
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
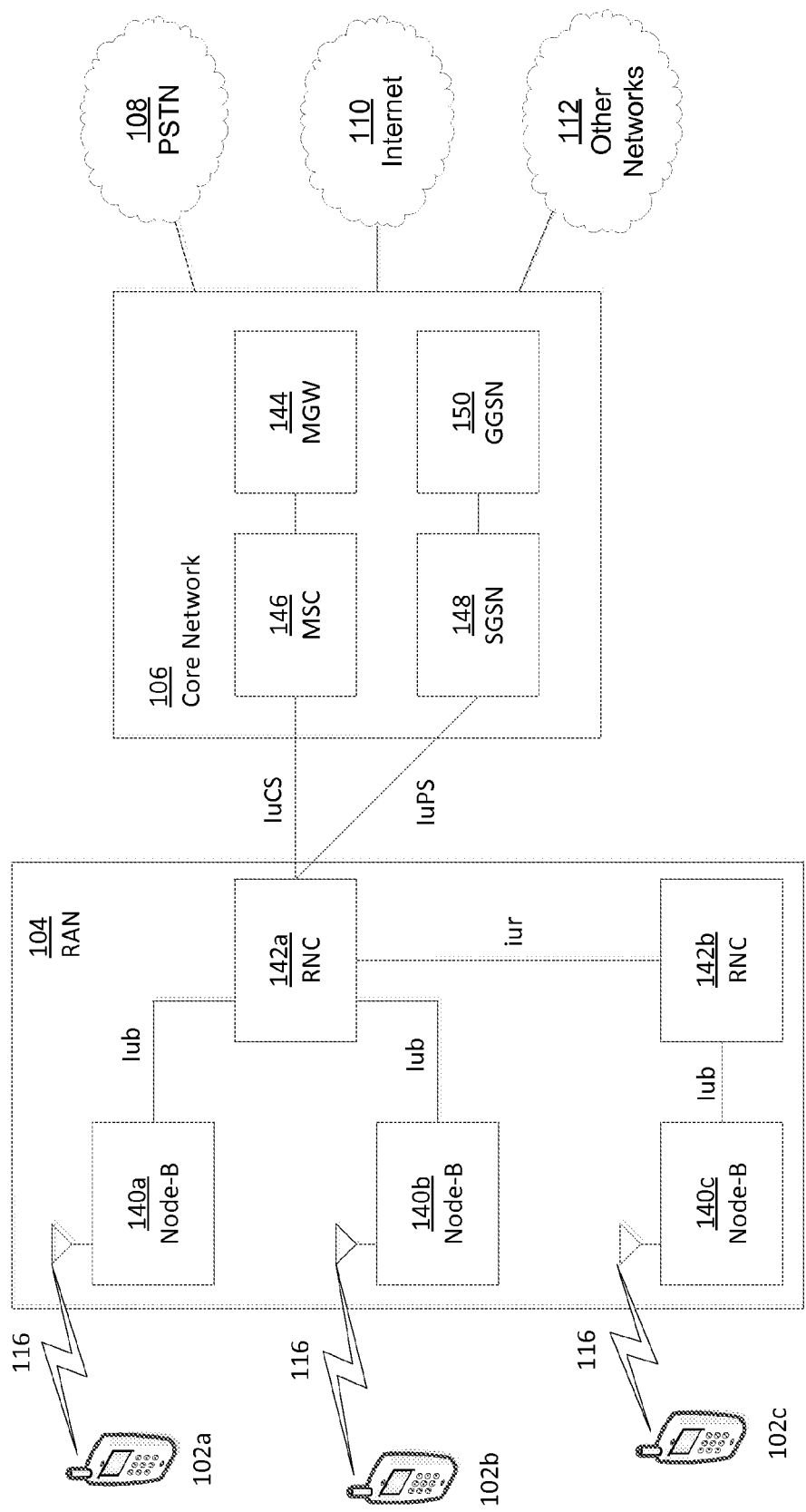
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
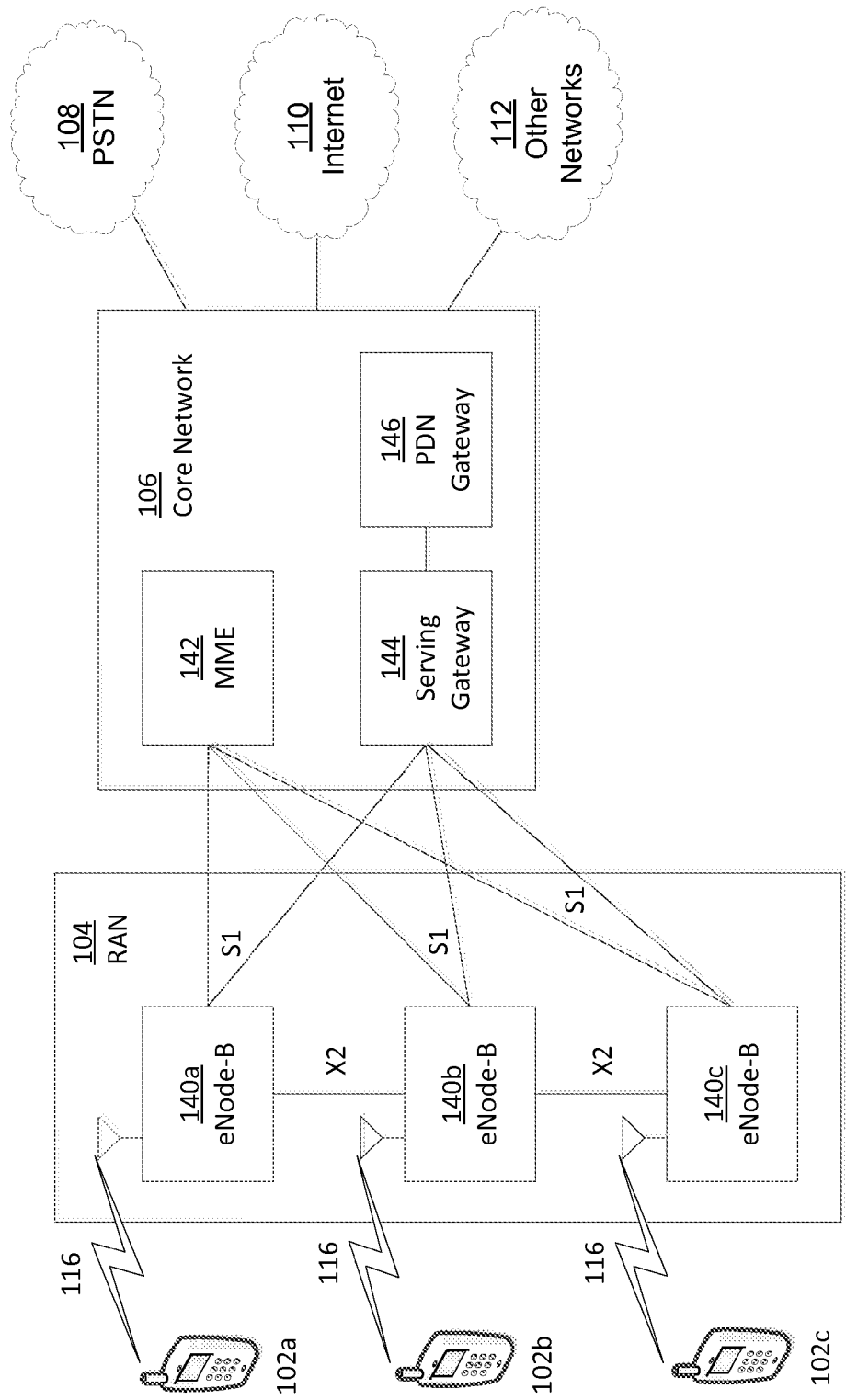
FIG. 1D is a system diagram of an another example radio access network and an another example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
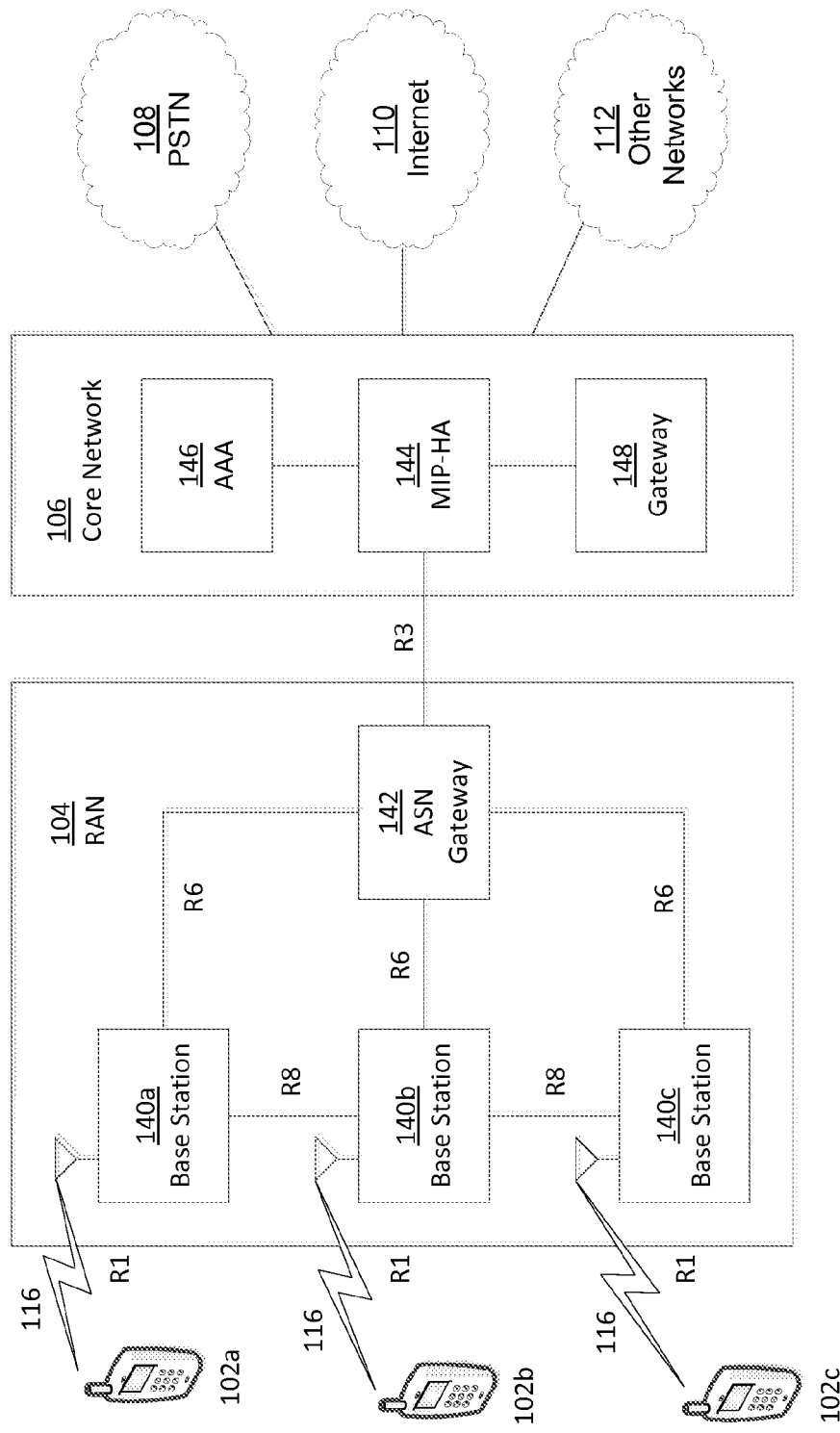
FIG. 1E is a system diagram of an another example radio access network and an another example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 and the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Systems, methods, and instrumentalities are disclosed to provide privacy for inter-user equipment transfer (IUT) subscribers and remote parties involved in sessions with IUT subscribers. A first UE may establish a session with a remote party that may be a media source in the session. The first UE may seek to perform an IUT to a second UE (e.g., the first UE may seek to transfer a component of the session to the second UE). The first UE may send a first request for the IUT to a service centralization and continuity application server (SCC AS). The SCC AS may receive the first request and perform an authorization of the first request. That is, the SCC AS may determine whether the IUT is allowed for the session. For example, the SCC AS may determine whether the remote party, or a network associated with the remote party, has indicated that IUTs be rejected (e.g., the SCC AS may have received an indication that IUTs be rejected for sessions subject to digital rights management). The SCC AS may reject the first request when determining that IUTs are not allowed for the session.

The SCC AS may determine that the requested IUT is allowed for the session (e.g., based on information available to the SCC AS). The SCC AS may send a second request to the remote party indicating the requested IUT. The second request may include information relating to the requested IUT. For example, the second request may indicate an identity relating to a user equipment that is a target of the requested IUT, e.g., the second request may comprise a modified session description protocol message that indicates an identity of the second UE. The remote party may evaluate the second request and may accept or reject the second request. For example, the remote party may send an acceptance to the SCC AS. The SCC AS may receive the acceptance and send a control message to the remote party for transfer of the media component to a user equipment that is a target of the requested IUT (e.g., the second UE). The control message may be a modified session description protocol message.

When an inter-user equipment transfer (IUT) subscriber is involved in a session with a remote party, the remote party may be an IUT subscriber, a normal subscriber, a content provider, etc. The remote party may be or may communicate via a UE, server, etc. For a remote party, it may be undesirable that the session be transferred or replicated. For a remote party, it may be undesirable that one or more media flows of the session are transferred or replicated. That is, the remote party may want to prevent the IUT subscriber it is in a session with from transferring or replicating one or more flows of the session. For example, the remote party may want to prevent the IUT subscriber from transferring or replicating one or more flows to another subscriber. The IUT subscriber may want to hide transfers or replications of sessions or media flows from the remote party. Whether the privacy of the remote party or the IUT subscriber prevails may be a matter of operator policy. It may be undesirable to hide IUT actions from the remote party (e.g., from the perspective of the remote party).

Systems, methods, and instrumentalities are disclosed to provide privacy for IUT subscribers and for remote parties involved in sessions with IUT subscribers. The embodiments disclosed herein may provide techniques for the remote party and IUT subscriber to indicate that privacy is requested for an IMS session that may be subject to IUT. The embodiments disclosed herein may provide techniques such that IUT procedures may be indicated to the remote party so the remote party may accept or reject an IUT procedure in an ongoing session.

A remote party may indicate restrictions on transfer and/or replication of a session currently being established. A content server may restrict transfer or replication when it is sending media flows towards the IUT subscriber that are subject to copyright/digital rights management (DRM) requirements. In an example, the remote party may engage with an IUT subscriber (e.g., knowing the other end is an IUT subscriber or not knowing the other end is an IUT subscriber). The remote party may indicate (e.g., to the content server) that it does not want IUT procedures, such as transfer, replication, etc., to be applied to the session, or media flows in the session, before the nature of the session is known (e.g., conversation of a sensitive nature, media not to be shared with others, etc.).

Figure 2:
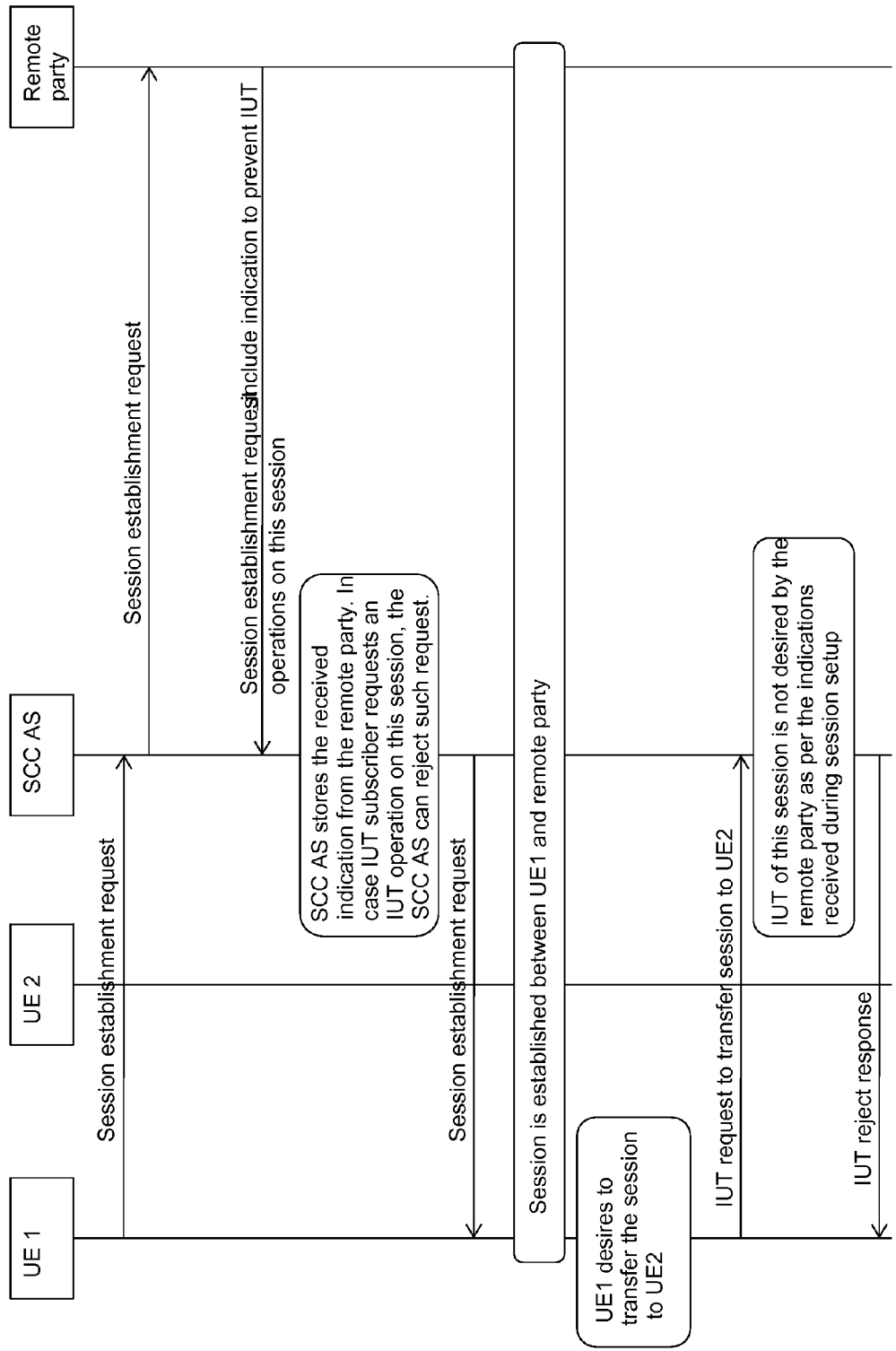
FIG. 2 illustrates an exemplary message flow diagram of a remote party restricting IUT operations in a session.

FIG. 2 illustrates an exemplary message flow diagram of a remote party restricting IUT operations in a session (e.g., a remote party may provide an indication to prevent IUT transfer and/or replication of the flows in the session). The remote party may provide the indication to the SCC AS via a privacy/DRM request during session initiation. The message from the remote party may be a response to a received session establishment request and may include the remote party's preferences for preventing IUT occurring on the session. If the remote party requests session establishment with an IUT subscriber (e.g., knowing that they subscribe to IUT, or otherwise), such a remote party may include in the session establishment request preferences for preventing IUT occurring on the session. Such preferences may be stored by the IUT subscriber's SCC AS for use to reject IUT requests if the remote party indicated such requests are to be disallowed during this session.

The IUT subscriber may indicate to the SCC AS whether it wants to withhold one or more IUT actions from the remote entity. That is, the IUT subscriber may indicate that it wants IUT actions to be transparent to the remote party, for example IUT actions take place without the remote party having knowledge of the IUT actions. The IUT subscriber may indicate such preferences as a subscriber configuration. The IUT subscriber configuration may be communicated to the network via direct communication with the network provider (e.g., by phone, web portal, etc.), by sending privacy preferences to the SCC AS over a Ut interface using XCAP, or the like. The IUT subscriber preferences may be provisioned when the subscriber subscribes for IUT service. IUT subscriber privacy preferences may be sent to the network in the request for session establishment, in a request for IUT, etc.

Systems, methods, and instrumentalities may be provided wherein the remote party may learn that an IUT subscriber has requested a transfer and/or replication of one or more flows of a session. The remote party may accept or reject the request to transfer and/or replicate the one or more flows.

Figure 3:
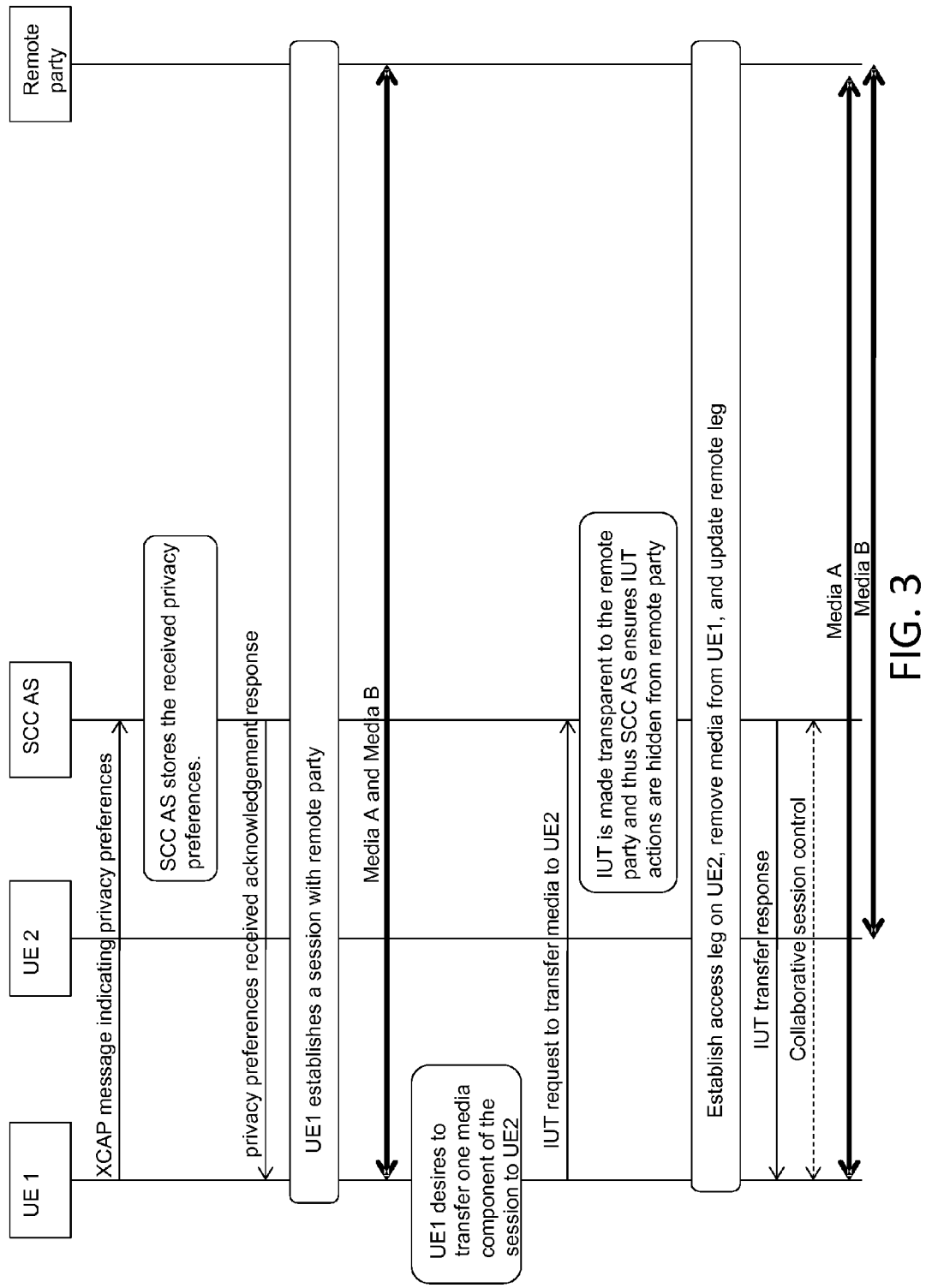
FIG. 3 illustrates an exemplary message flow diagram for providing privacy to IUT subscribers.

FIG. 3 illustrates an exemplary message flow diagram for providing privacy to IUT subscribers. FIG. 3 shows an IUT subscriber's user equipment, UE 1, requesting privacy settings using an XCAP message. UE 1 may send privacy preferences to a service centralization and continuity application server (SCC AS). For example, UE 1 may indicate one or more of the following: (1) hide IUT actions from a remote party; (2) no privacy preference for IUT actions (e.g., a remote party may be made aware of IUT actions performed on the session); (3) hide IUT actions from selective remote party users; (4) and the like. The request for privacy settings may be included in the request for IUT.

Still referring to FIG. 3, the IUT request may result in an update to the remote party. This may primarily be a session description protocol (SDP) update so that the media may be directed to the correct UEs. This may be different than providing the remote party an opportunity to reject an IUT request, since the update to the remote party may be limited to making the remote party aware of the new session details once the IUT has been requested and granted. If it is possible to anchor the media plane in the IUT user's network (e.g., SCC AS controls a media resource function (MRF)), then each IUT action may be hidden from the remote party.

A UE may use an XCAP message indicating privacy preferences. A UE may include privacy preferences in a request for session establishment. A UE may include privacy preferences in the request for IUT. Such preferences may be limited to application in the current session. The SCC AS may store the privacy preferences received from a UE. The SCC AS may apply the stored privacy preferences when an IUT is requested.

Privacy preferences, e.g., in requests for session establishment or requests for IUT, may be indicated by extending the privacy header field in session initiation protocol (SIP) or through other indications within the SIP message, e.g., through extensions to the SIP protocol, through extensions to session description protocol (SDP), by including within a SIP message a body that indicates privacy preferences, etc.

During session establishment, the remote party may indicate that copyright and/or DRM requirements need to be applied to the media that is exchanged in the session. Such indications may be considered as an extension of the SDP. New attributes may be defined such as "a=drm-applied," which may be applicable to specific media components of the session, or applicable to the entire session. If the SCC AS receives such indications, it may reject IUT actions that are requested to be performed on the restricted media flows or to be performed on the session. Such DRM requirements may override privacy preferences that are requested by the IUT user.

A remote party may add indications in session establishment messages that IUT actions should be restricted. These indications may be implemented through SDP attributes, which may be included by the remote party, for example in SDP offers, SDP answers, etc. (e.g., the media description negotiation process that may occur during session establishment). The above techniques may be included in requests for session establishment, when a remote party calls an IUT subscriber, in responses to session establishment when an IUT subscriber calls a remote party, e.g., a UE, etc.

It may be beneficial to dynamically indicate to the remote party that IUT actions are being requested by the IUT subscriber with whom the remote party is in a session. For example, when an IUT is requested, the remote party may be alerted and given the opportunity to reject the IUT request. In addition to a modified SDP, which may indicate if media flows are moved to a different device or if media flows are to be replicated, the public user identity of the user that the media is being transferred and/or replicated to may be indicated.

Figure 4:
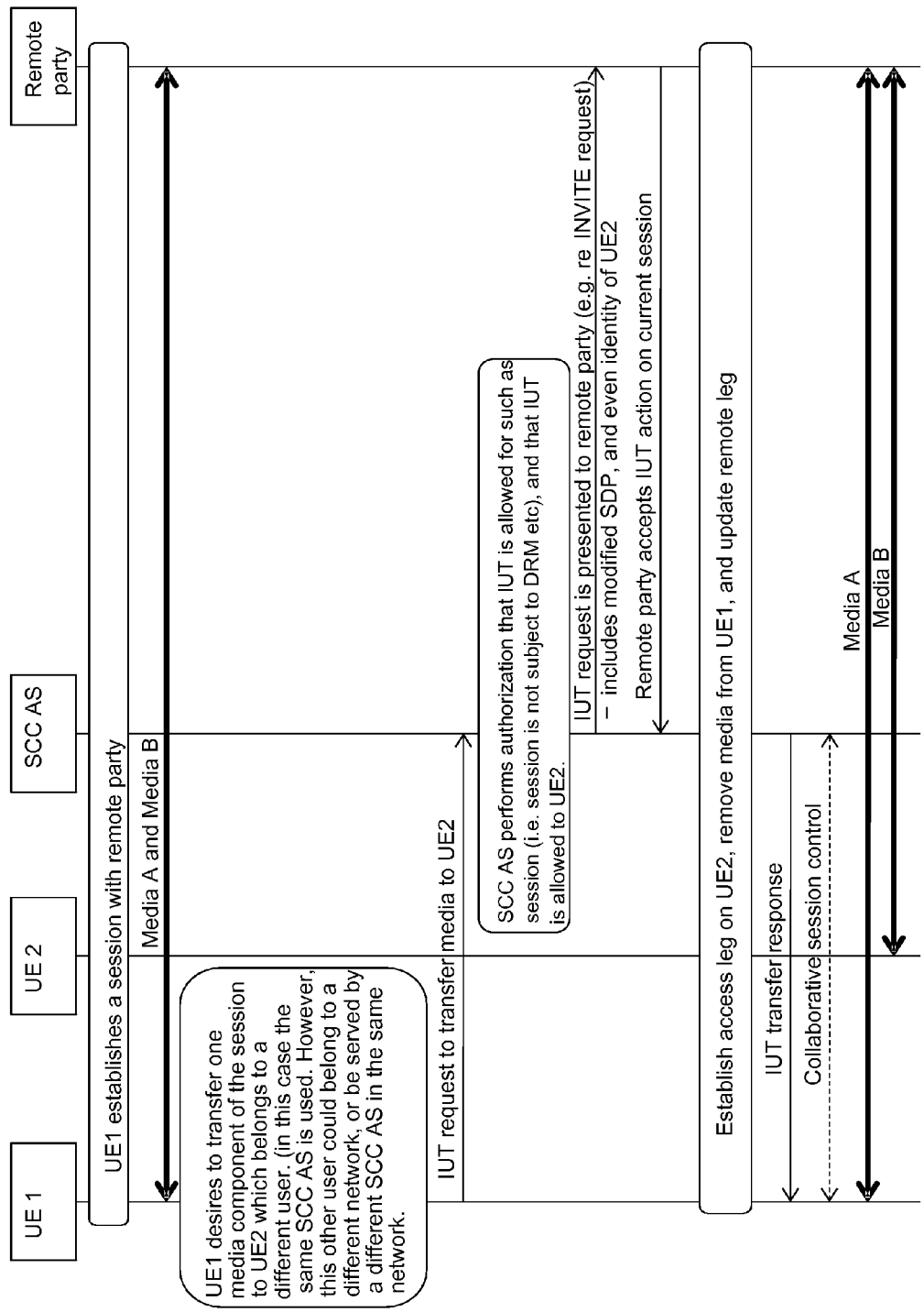
FIG. 4 illustrates an exemplary message flow diagram showing how a remote party may be made aware of IUT requests.
Figure 5:
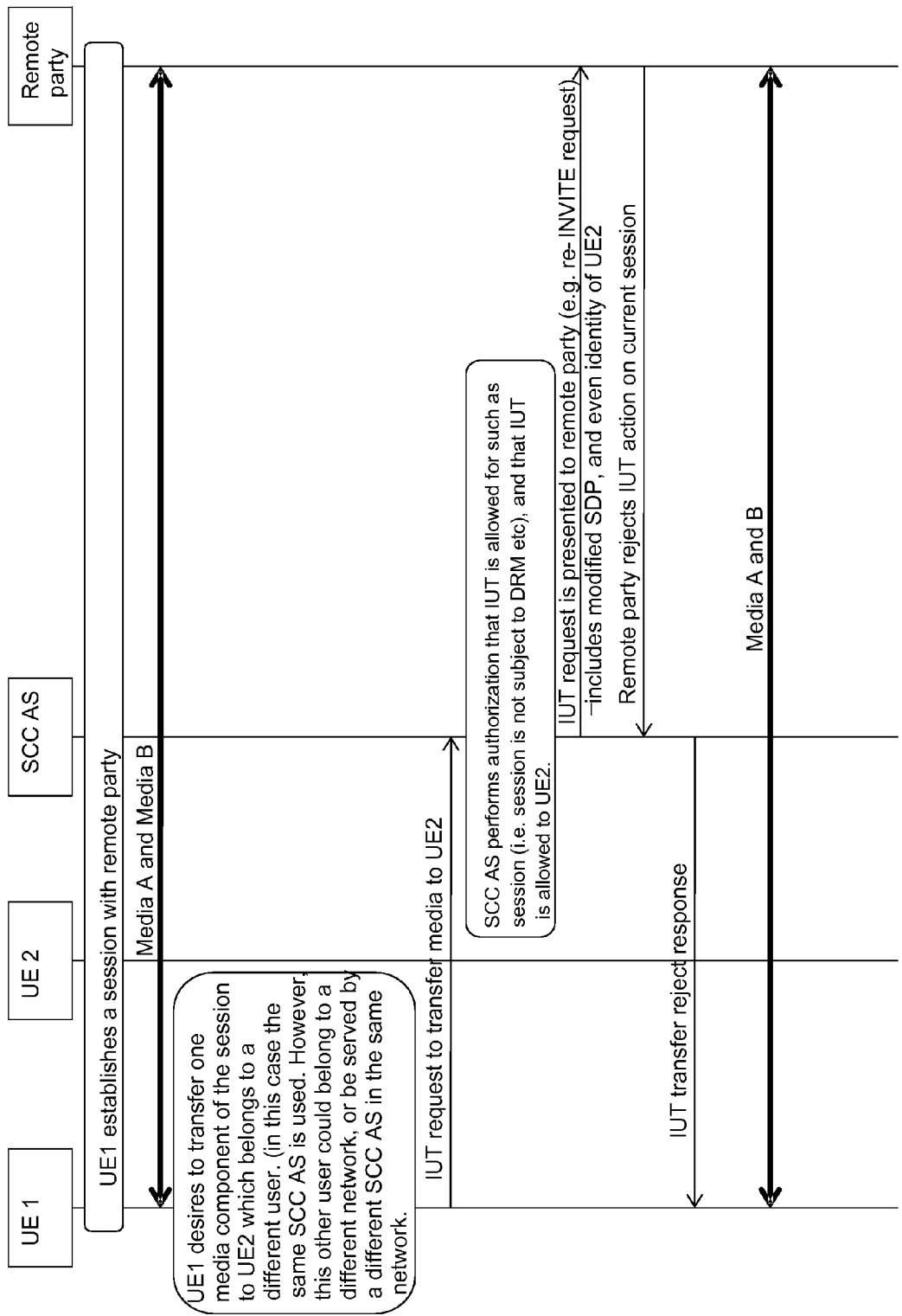
FIG. 5 illustrates an exemplary message flow diagram showing rejection of IUT actions by a remote party.

FIG. 4 illustrates an exemplary message flow diagram showing how a remote party may be made aware of IUT requests and given the opportunity to reject an IUT according to embodiments of the present disclosure. FIG. 5 illustrates an exemplary message flow diagram showing rejection of IUT actions by a remote party. The above may be applied to both push mode, and pull mode IUTs (e.g., an IUT initiated by the source UE and an IUT initiated by the target UE), IUTs to transfer some media components, adding media components on a different UE, transferring a session from source UE to target UE (e.g., UE1 to UE2), for replication of the session or replication of some media components (e.g., using replication by the network or replication by the remote party), etc. That is, procedures may be added to each IUT, whereby the SCC AS may send to the remote party a request that comprises the IUT actions requested and wait for the remote party to grant permission that the IUT may be performed on the current session. The SCC AS may continue with performing the IUT action (e.g., if allowed by the remote party), or reject the IUT request (e.g., if IUTs are not allowed by the remote party).

The message sent to a remote party to alert it to IUT actions being requested on the session or media components in the session may include information describing the IUT. A modified SDP may show that one or more media components of the session are being transferred and/or replicated to a different destination (e.g., a different UE with a different IP address). If the session is being transferred (e.g., each flow associated with the session), then the contact and/or identity information of the target UE may be included in the SIP headers. The attribute "a=3gpp.iut.controllee" may be included in the SDP and may be included in the update to the remote party to alert it to the IUT actions being requested by the IUT subscriber. This attribute may include the identity of the UE to which the media or session is being transferred and/or replicated. The remote party may decide to accept or reject the IUT action on the session based on who is becoming involved in the session as a result of the IUT.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for performing an inter user equipment transfer, the method comprising:
   receiving an indication of a privacy preference for an inter user equipment transfer action;
   receiving a first request for the inter user equipment transfer of a media component of a session;
   in response to receiving the first request, determining that the requested inter user equipment transfer is allowed for the session, wherein determining that the requested inter user equipment transfer is allowed for the session comprises determining that the session is not subject to copyright-based digital rights management;
   if the privacy preference indicates that a source of the media component of the session be made aware of an inter user equipment transfer performed on the session, sending a second request to the source of the media component indicating the requested inter user equipment transfer; and
   receiving an acceptance of the requested inter user equipment transfer from the source of the media component.

2. The method of claim 1, wherein the second request indicates an identity relating to a user equipment that is a target of the requested inter user equipment transfer.

3. The method of claim 2, wherein the identity is a session initiation protocol identity.

4. The method of claim 1, wherein the second request comprises a modified session description protocol message comprising an attribute, wherein the attribute indicates an identity of a user equipment that is a target of the requested inter user equipment transfer.

5. The method of claim 1, further comprising sending a control message to the source of the media component for transfer of the media component to a user equipment that is a target of the requested inter user equipment transfer, wherein the control message is a modified session description protocol message.

6. A service centralization and continuity application server, comprising:
   a receiver configured to receive an indication of a privacy preference for an inter user equipment transfer action and to receive a first request for the inter user equipment transfer of a media component of a session;
   a processor configured to, in response to receiving the first request, determine that the requested inter user equipment transfer is allowed for the session, wherein determining that the requested inter user equipment transfer is allowed for the session comprises determining that the session is not subject to copyright-based digital rights management; and
   a transmitter configured to, if the privacy preference indicates that a source of the media component of the session may be made aware of an inter user equipment transfer performed on the session, send a second request to the source of the media component indicating the requested inter user equipment transfer; and
   wherein the receiver is further configured to receive an acceptance of the requested inter user equipment transfer from the source of the media component.

7. The service centralization and continuity application server of claim 6, wherein the second request indicates an identity relating to a user equipment that is a target of the requested inter user equipment transfer.

8. The service centralization and continuity application server of claim 7, wherein the identity is a session initiation protocol identity.

9. The service centralization and continuity application server of claim 6, wherein the second request comprises a modified session description protocol message comprising an attribute, wherein the attribute indicates an identity of a user equipment that is a target of the requested inter user equipment transfer.

10. The service centralization and continuity application server of claim 6, wherein the transmitter is further configured to send a control message to the source of the media component for transfer of the media component to a user equipment that is a target of the requested inter user equipment transfer, wherein the control message is a modified session description protocol message.

11. The method of claim 1, further comprising receiving, during an initiation of the session, an indication of a restriction applicable to a component of the session.

12. The method of claim 11, wherein the restriction applies to at least one of a transfer or a replication of the component of the session.

13. The method of claim 11, wherein the indication of the restriction comprises an attribute applied to the component of the session.

14. The method of claim 11, wherein the indication of the restriction overrides the privacy preference.

15. The service centralization and continuity application server of claim 6, wherein the receiver is further configured to receive, during an initiation of the session, an indication of a restriction applicable to a component of the session.

16. The service centralization and continuity application server of claim 15, wherein the restriction applies to at least one of a transfer or a replication of the component of the session.

17. The service centralization and continuity application server of claim 15, wherein the indication of the restriction comprises an attribute applied to the component of the session.

18. The service centralization and continuity application server of claim 15, wherein the indication of the restriction overrides the privacy preference.

19. The method of claim 1, wherein the indication of the privacy preference is provided by the source of the media component.

20. The service centralization and continuity application server of claim 6, wherein the indication of the privacy preference is provided by the source of the media component.

* * * * *